United States Patent [19]
Cretti

[11] Patent Number: 4,742,641
[45] Date of Patent: May 10, 1988

[54] PERMANENTLY INSTALLED PEST EXTERMINATION SYSTEM

[76] Inventor: David J. Cretti, 2532 KomoMai Dr. #2, Pearl City, Hi. 96782

[21] Appl. No.: 2,427
[22] Filed: Jan. 12, 1987
[51] Int. Cl.$^4$ .............................................. A01M 7/00
[52] U.S. Cl. ..................................... 43/132.1; 43/124
[58] Field of Search ................................ 43/124, 132.1

[56] References Cited

U.S. PATENT DOCUMENTS

| | | | |
|---|---|---|---|
| 2,981,025 | 4/1961 | Woodson | 43/124 |
| 3,513,586 | 5/1970 | Meyer et al. | 43/124 |
| 3,602,248 | 8/1971 | Peacock | 137/357 |
| 3,614,841 | 10/1971 | Query | 43/124 |
| 3,676,949 | 7/1972 | Ramsey | 43/124 |
| 3,782,026 | 1/1974 | Bridges et al. | 43/124 |
| 4,028,841 | 6/1977 | Lundwall | 43/124 |
| 4,048,747 | 9/1977 | Shanahan | 43/114 |
| 4,648,202 | 3/1987 | Renth | 43/132.1 |

FOREIGN PATENT DOCUMENTS 0068606  1/1983  European Pat. Off. ............. 43/124

Primary Examiner—Kurt Rowan
Attorney, Agent, or Firm—James H. Phillips

[57] ABSTRACT

In order to achieve effective control of pests (such as insects and rodents) in residential and commercial buildings, a permanently installed pest control system is disclosed which is particularly adapted for incorporation into existing structures without substantial modification. The system includes an exterminating liquid supply subsystem and an exterminating liquid distribution subsystem. The supply subsystem includes a replaceable exterminating liquid reservoir, an electrically driven pump and switch means (which may include a time clock and a short term timer) coupled to a source of electrical energy to selectively energize the pump. The distribution subsystem includes a trunk tube connected to the pump to receive pressurized exterminating liquid drawn from the reservoir and one or more branch tubes extending throughout the building at a position near the floor, each branch tube having a plurality of outwardly directed small apertures piercing its wall at intervals along its length to effect nozzles through which pressurized exterminating liquid is dispensed into the inter-wall space and/or onto the area at which the wall and floor meet. Optionally, a pressure sensor may be placed on the output side of the pump to provide an indication of an empty reservoir (pressure drops below normal) or a substantial blockage in the distribution system (pressure rises above normal).

1 Claim, 2 Drawing Sheets

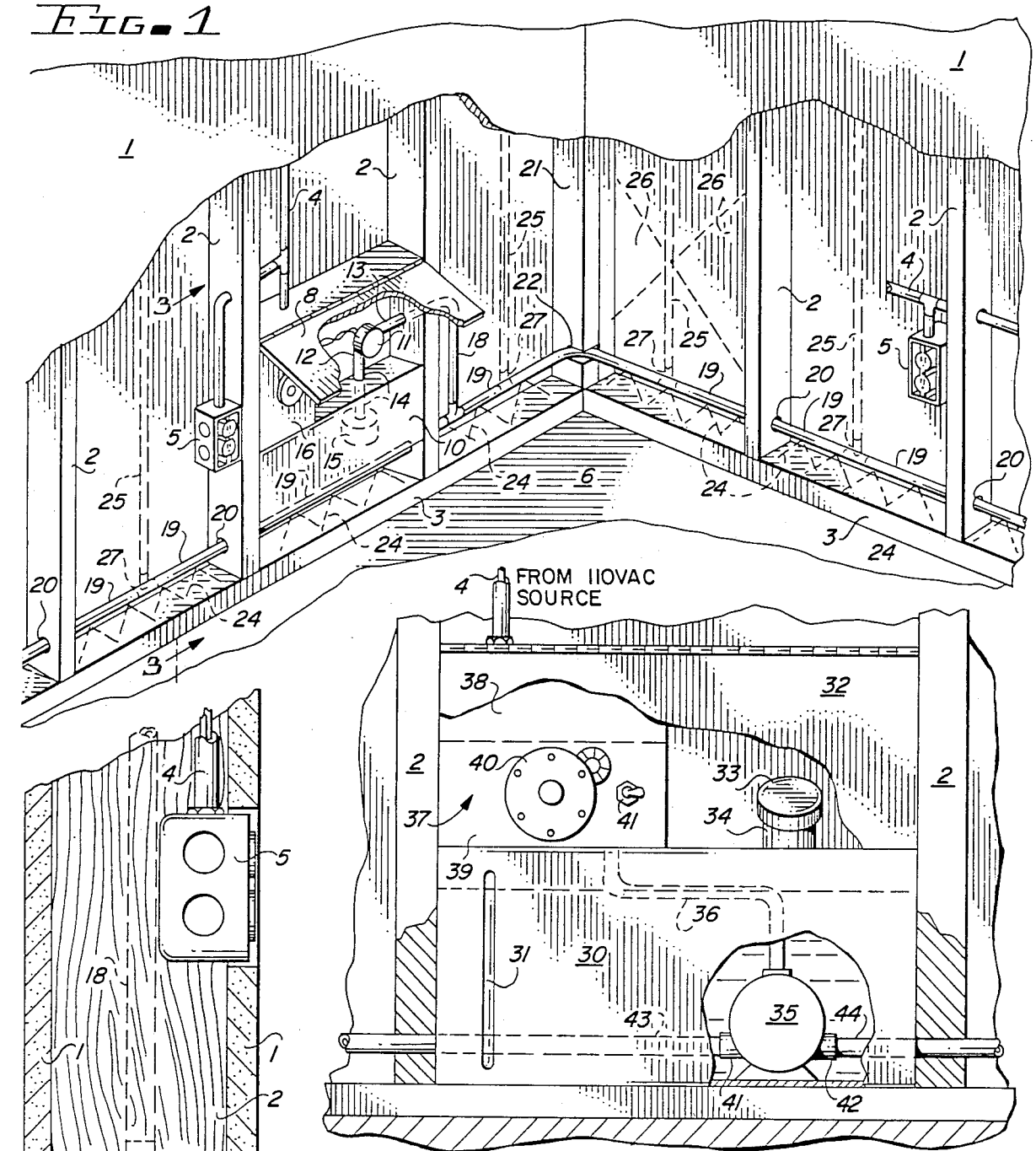
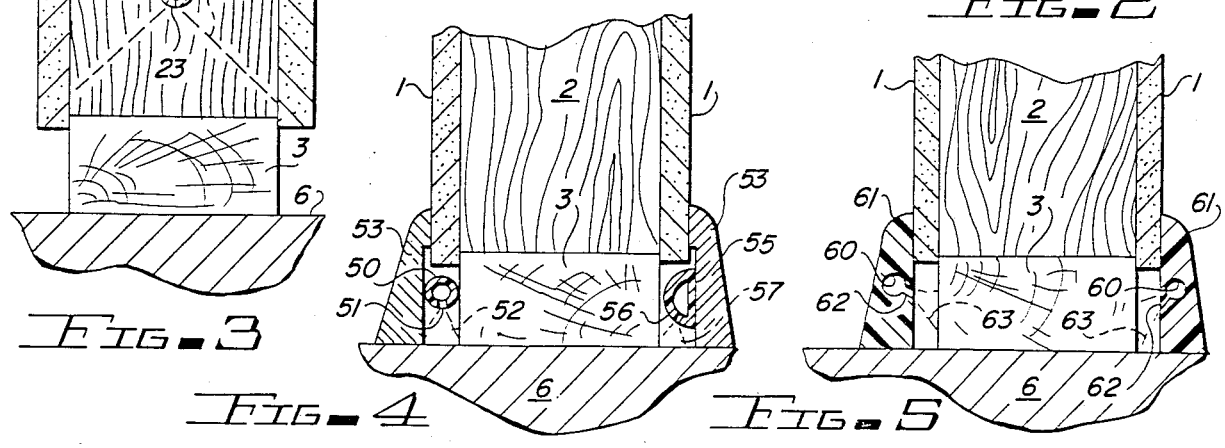

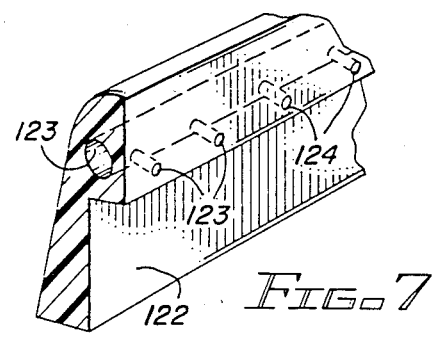
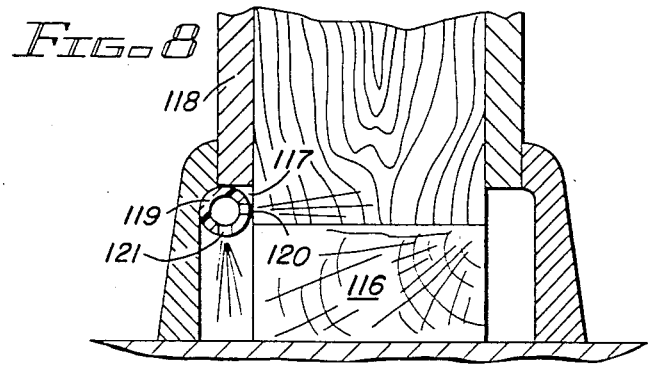
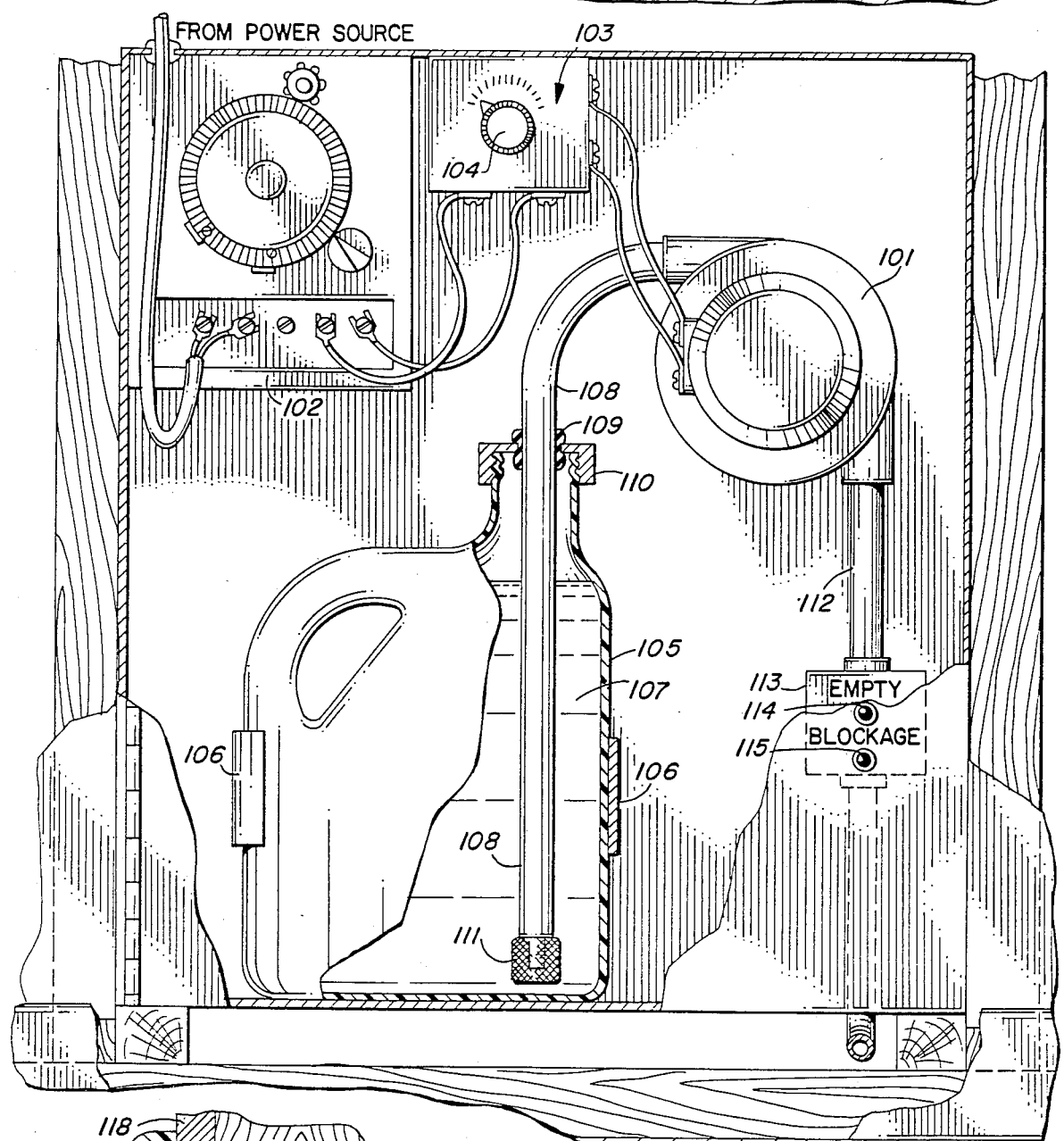
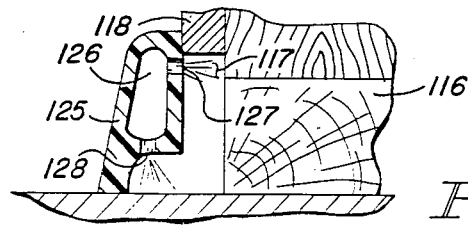

PERMANENTLY INSTALLED PEST EXTERMINATION SYSTEM

FIELD OF THE INVENTION

This invention relates to the pest extermination arts and, more particularly, to such a system which is permanently installed in a building.

BACKGROUND OF THE INVENTION

Mankind's ongoing war with pests, particularly insects and rodents, infesting his living, working and recreational quarters is notoriously well-known and the subject of constant efforts to gain the upper hand. Commercial establishments are replete with products for the consumer to personally employ in his fight against these invasive pests. Further, an entire industry has grown up around extermination services which undertake to regularly treat residential dwelling houses and commercial buildings by distributing quantities of appropriate pesticides about the premises on a regular basis. These services are relatively expensive, but the best of them, frequently used, can indeed at least control the pest population to a tolerable level. However, even the best such services are limited in their regularity of attention and also in the areas of a building which can be treated because of physical limitations. For example, in order to treat the areas inside a wall which some pests favor vor as their own habitats, it is necessary to physically pierce the wall covering to obtain access for administering the pesticide. This is obviously a time consuming and expensive undertaking.

Pests can become so securely entrenched in some buildings that it is necessary to undertake such extreme measures as removing entire wall coverings to admit a more thorough treatment or, even more extreme, to completely envelop the building with an impervious sheet of plastic material and then introduce a pesticide spray in great quantities to permit its thorough dispersion throughout the building. Subsequently, after an appropriate period of time, the plastic sheath is removed and the building must then be thoroughly aired before it can again be inhabited. Nonetheless, even these extreme measures are, at best, temporarily successful since the pests, particularly the ubiquitous cockroach, are possessed of amazing persistance.

Therefore, those skilled in the art will appreciate that it would be highly desirable to provide a system for readily and thoroughly treating a building with pesticide in the most sensitive areas as often as may be required without the necessity for subscribing to an extermination service. It is to this end that my invention is directed.

OBJECTS OF THE INVENTION

It is therefore a broad object of my invention to provide an improved pest extermination system.

It is another object of my invention to provide a pest extermination system which is permanently installed in a building structure.

In another aspect, it is an object of my invention to provide such a pest extermination system which may be permanently installed in a structure under construction, one under major refurbishing or one in which minimal disturbance to the building structure is desired.

In yet another aspect, it is an object of my invention to provide such a pest extermination system which may be actuated manually or under the control of timing means to periodically dispense, on a regular basis, exterminating liquid in the areas of a building at which the most efficient use of the pesticide is obtained.

SUMMARY OF THE INVENTION

These and other objects of my invention are achieved by providing a pest extermination system comprising an exterminating liquid supply subsystem including a replenishible reservoir for holding a supply of exterminating liquid, an electrically driven pump for withdrawing the exterminating liquid and issuing it under pressure and switch means (which may include a time clock) coupled to a source of electrical energy to selectively energize the pump. The pest extermination system further comprises an exterminating liquid distribution subsystem including a distribution trunk tube connected to the pump to receive pressurized exterminating liquid drawn from the reservoir and one or more main branch tubes extending horizontally through the wall spaces of the building at a position near the floor, each branch tube having a plurality of downwardly directed small apertures piercing its wall at intervals along its length to effect nozzles through which pressurized exterminating liquid is dispensed downwardly. In a variant configuration particularly adapted for incorporation into existing structures without substantial modification, a branch passage is employed which extends generally horizontally along a wall and is disposed proximate a floor joining the wall, the branch passage being provided with a plurality of small generally downwardly directed apertures piercing its side wall at intervals along its length to effect nozzles through which pressurized exterminating liquid is dispensed in the area at which the wall and floor meet. In a refinement to the variant configuration, the branch passage may be integrated within a length of trim adapted to improve the appearance of a junction between a wall and an adjoining floor.

Preferably, a short timing period device is incorporated electrically intermediate the time clock and the pump to permit control of each dosage cycle to a matter of a predetermined number of seconds even if the time clock is incapable of such fine control. Optionally, a pressure sensor may be placed on the output side of the pump to provide an indication of an empty reservoir (pressure drops below normal) or a substantial blockage in the distribution system (pressure rises above normal). The reservoir is preferably a replaceable unit which is available commercially and which is fitted with a removeable cap to adapt it to the system.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a partially cut away view of building walls joining at right angles which serve to illustrate the installation of the exterminating liquid supply subsystem and the manner in which it is coupled to the exterminating liquid distribution subsystem and particularly illustrating the disposition in the wall space of the latter;

FIG. 2 is a fragmentary view illustrating the general configuration of one embodiment of the exterminating supply subsystem;

FIG. 3 is a partially cut away cross sectional view taken along the lines 3—3 of FIG. 1 showing more particularly the disposition in the wall space of an exemplary branch tube and its preferred spray pattern;

FIG. 4 illustrates variant configurations for an embodiment of my invention particularly adapted to incorporation into an existing building without extensive structural changes thereto;

FIG. 5 is a view similar to FIG. 4 illustrating another variation of the embodiment illustrated in FIG. 4 and which is particularly characterized by its incorporation into decorative trim which also serves as distribution passages for the branches of the exterminating liquid distribution subsystem;

FIG. 6 illustrates a presently preferred embodiment of the exterminating liquid supply subsystem assembly;

FIG. 7 illustrates another variant configuration for the spray distribution component of the system;

FIG. 8 illustrates still another variant, and somewhat simplified, configuration for the spray distribution subsystem; and FIG. 9 illustrates still yet another variant configuration for the spray distribution component which is capable of providing particularly effective coverage.

DETAILED DESCRIPTION OF THE INVENTION

Referring now to FIG. 1, it will be observed that the wall panels 1 of a room are shown partially cut away in order to reveal an exemplary installation of my invention as it may be incorporated into a building during its construction or during extensive renovations. For purposes of illustration, the exemplary installation is shown in an environment in which standard wooden stud construction has been employed to provide the vertical load bearing function in the structure. Thus, a plurality of studs 2 extend upwardly from a floor plate 3 and, as a consequence of their width, define a wall space between the inner and outer wall panels when installed. Disposed within the wall space is conventional electrical wiring 4 which includes conventional electrical outlets 5 distributed and positioned in accordance with the relevant electrical code. Typically, such codes require that the electrical outlets 5 and all other components of the electrical wiring system be disposed a minimum height above the floor 6. One common electrical code requirement is that the outlets and wiring be at least twelve inches above the surface of the floor. As will become more apparent as the description of the invention proceeds, the position of the electrical wiring and the electrical outlets 5 is relevant to correct installation of the subject pest exterminating system.

The permanently installed pest extermination system comprises an exterminating liquid supply subsystem and an exterminating liquid distribution subsystem. Still referring to FIG. 1, the exterminating liquid supply subsystem includes a replenishible reservoir 10, an electrically driven pump 11 having an inlet 12 and an outlet 13. A supply tube 14 couples the pump inlet to the reservoir for establishing fluid communication to permit withdrawing of exterminating liquid from the reservoir by the pump when it is energized. Preferably the supply tube 14 extends through the top of the reservoir 10 and terminates with an open end near the reservoir bottom. If desired, a filter screen 15 may be situated at the bottom of the supply tube 14 to insure that small solid particles within the reservoir are not pulled into the pump 11.

A switch unit 16 receives electrical power through the electrical wiring 4 and controls the electrical power to selectively energize the pump 11 in a manner which will be more fully described below in connection with FIG. 2.

A distribution trunk tube 18 is connected between the outlet 13 of the pump 11 and a main branch tube 19. Main branch tube 19 is horizontally disposed within the wall space and wall beneath the bottom of the electrical wiring 4 including the electrical outlets 5. Typically, the main branch tube 19 is supported by and passes through apertures 20 bored through the studs 2. At the corner stud 21, the main branch tube is conveniently supported by a notch 22 cut into the corner stud.

Referring now to FIG. 3 in conjunction with FIG. 1, a plurality of downwardly directed small apertures 23 radially pierce the side wall of the main branch tube 19 along its length to effect nozzles through which exterminating liquid pressurized by the pump 11 is dispensed downwardly in a spray 24. As best shown in FIG. 3, the spray 24 preferably covers a relatively large area such that the corners between both walls 1 and the floor plate 3 are encompassed. In addition, the spacing of the apertures 23 along the length of the main branch tube 19 are preferably sufficiently close as to provide a slight overlapping between the spray areas from successive apertures to thereby effect complete coverage of the upper surface of the floor plate 3 when the pump 11 is energized, thereby setting up an essentially "impregnable" barrier to encroaching pests traversing the interior wall space.

Again referring to FIG. 1, those skilled in the art will appreciate that most insects, such as the lamentable cockroach, are perfectly capable of traversing vertical surfaces such as the inside surfaces of the wall panels 1. An optional configuration which affords further coverage against pests of this class consists of vertically extending secondary branch tubes 25 disposed intermediate adjacent studs 2 and provided with a plurality of radially outwardly directed apertures distributed along its length to effect nozzles through which pressurized exterminating liquid may be dispensed as demonstrated by the sprays 26 shown at one position only to avoid cluttering the figure. Each vertically extending secondary branch tube is connected to the horizontally extending main branch tube 19 as at 27. Care must be taken, of course, to avoid the use of vertical branch tubes 25 in spaces between studs that also carry open wiring. However, if conduit is used as illustrated in FIG. 1, and sufficient care is taken to seal the entry of the wiring 4 into the outlets 5, switches (not shown in FIG. 1), etc., then vertical branch tubes may be provided between each adjacent pair of studs to effect essentially complete coverage. Also contemplated as a natural extension of the pesticide distribution system is the deployment of horizontal tertiary branch tubes in the space above the room ceiling (not shown). Such tertiary branch tubes may be provided with downwardly directed apertures distributed along their lengths in order to effect coverage with pesticide to the upper surface of the ceiling. It will be apparent that these ceiling-disposed tertiary branch tubes, as well as the secondary and main branch tubes, may be fed by other distribution trunk tubes, the entire system being interconnected for fluid communication as may be appropriate for a given installation. In addition, those skilled in the art will appreciate that the ends of all the branch tubes must be capped off in order to maintain pressure in the system.

The entire exterminating liquid supply subsystem may be conveniently contained in a box which can either be situated on the outside of a wall in a convenient location or, as shown in both FIGS. 1 and 2, between adjacent studs and provided with a cover 8 for admitting access to the subsystem for replenishing the supply of exterminating liquid, operating the system manually or adjusting the timer of the switch unit 16.

FIG. 2 shows a variation of the exterminating liquid supply subsystem which better shows certain of its features and also includes variations from the subsystem shown in FIG. 1. Thus, a replenishible reservoir 30 is provided with a sight tube 31 to permit monitoring the level of pesticide in the reservoir 30. When it is necessary to replenish the supply of pesticide, the lid 32 is lifted to access a filler spout 34 leading into the top of the reservoir 30. A cap 33 is removed to permit replenishing the supply of pesticide in the reservoir 30 after which the cap 33 is replaced. In the exterminating liquid supply subsystem shown in FIG. 2 it will be observed that a submersible electrically driven pump 35 is employed rather than the outside pump 11 previously described. The submersible pump 35 is energized through wiring contained in waterproof conduit 36 which is connected to the output of a timer/switch unit 37. The timer/switch unit 37 includes a transformer/rectifier assembly 38 which is fed by conventional 120 volts a-c wiring 4. The transformer/rectifier assembly 38 serves to reduce and convert the 120 volts a-c to (for example) 12 volts d-c for safety purposes. A switching unit 39 includes a timer switch 40 and an overriding manual switch 41 for selectively energizing the submersible pump 35.

During normal operation, the timer switch 40 is adjusted to energize the submersible pump 35 periodically to obtain the pest control appropriate for a given installation. Preferably, the timer will be set to energize the system at least once monthly for a sufficient period of time to thoroughly "wet" the areas exposed to the pesticide spray but insufficient to cause damage to the exposed areas as a result of over-wetting. Under difficult circumstances, such as, for example, in buildings containing restaurants, the timer may be set to actuate the system as often as once a day. Unusual needs can be met by actuation of the manual switch 41 to bypass the timer switch 40 and energize the submersible pump independently. Many timers which include such manual override switches also include means for shutting the manual switch off at the normal "off" time set by the timer in order to account for the situation in which the manual switch is thrown to the "on" position and forgotten or otherwise left unattended.

The submersible pump 35 has a pair of outlets 41, 42 which separately feed main branch tubes 43, 44 such that the main branch tubes also serve as the distribution trunk tube. The inlet (not shown) to the submersible pump 35 is simply directly open to the liquid in the replenishible tank 30.

The embodiments of the permanently installed pest extermination system discussed above are best adapted to incorporation into a building under construction or one in which renovation is being undertaken although its installation can also be carried out by simply removing wall panels. However, since this can itself be a substantial undertaking, I have provided other embodiments of my invention in which an exterminating liquid supply subsystem as previously described (or preferably as will be described below with reference to FIG. 6), either built in to a recess in a wall or housed in a separate housing, is employed in conjunction with a distribution subsystem including branch passages in one or more of the variant configurations illustrated in FIGS. 4, 5, 7, 8 and 9.

Thus, as shown in FIG. 4, the distribution subsystem may include branch passages such as the tubing so fixed, for example, to the edge of floor plate 6; i.e., outside the wall space between wall panels 1. The tubing 50 is provided with downwardly directed apertures 51 at intervals along its length to obtain the spray 52 into the corner at which the walls and the floor meet. Because of its proximity to the floor of the tubing 50, the apertures 51 are typically distributed more closely together than if the tubing were higher such as the tubing 19 in FIG. 3. Once installed the tubing 50 may be covered by standard molding 53 to improve the appearance of the junction between the wall and the adjoining floor 6.

An alternative configuration illustrated in FIG. 4 includes a "D-shaped" branch passageway 55 having downwardly and outwardly directly apertures 56 distributed along its length to issue a spray 57 into the corner at which the floor and wall meet. The advantage of the D-shaped passage 55 over the tubing 50 is that it is not subject to torsional distortion and therefore the direction of the spray 57 to the corner is assured.

FIG. 5 illustrates a further refinement of the system in which the distribution passages 60 are directly incorporated into trim 61 which may be extruded or otherwise conveniently formed. The trim 61 includes small downwardly and inwardly directed passages 62 to effect nozzles for issuing pressurized exterminating liquid carried in the passages 60 as a spray 63 into the area at which the floor 6 and the walls meet.

Referring now to FIG. 6, there is shown the heart of an exterminating liquid supply subsystem incorporating several innovations which provide significantly improved performance over the corresponding system components illustrated in FIGS. 1 and 2. For example, the pump 101 is selectively energized under the cooperative control of a first timer 102 and a second timer 103. It has been found that, in a correctly installed system, it is only necessary to energize the system more briefly than at might first be thought. For example, for many installations, a periodic energization period of one minute or less will serve to thoroughly wet the treated areas with the exterminating liquid to obtain the sought after "barrier" effect. Most commercially available timers, such as the first timer 102 and the timer 37 shown in FIG. 2, cannot achieve sufficiently close control of the system on period. Therefore, a second "short term" timer 103 is provided to respond to the establishment of the beginning of each system on time by the first timer 102 to establish a period during which the pump 101 is energized.

Thus, it will be understood that the first (coarse) timer 102 merely establishes the commencement of the system on condition during the relatively long intervals (biweekly, weekly, daily, etc.) between successive system cycles, and the second timer 103 responds to the commencement of the system on signal received from the first timer 102 to energize the pump 101 and shut the pump 101 off after the desired period of the system on time has expired. A range of system on periods may be obtained by providing adjustment knob 104 which typically changes the value of a resistive component in a conventional timing circuit such as those used in conjunction with the 555 integrated circuit.

In order to limit the amount of exposure to the exterminating liquid which might occur during the process of resupplying the system after the reservoir has been emptied, the reservoir of the supply subsystem shown in FIG. 6 is a replaceable container 105 held in place by brackets 106. Those skilled in the art will recognize that the container 105 is in a standard configuration in which exterminating liquids are supplied. Therefore, when a given reservoir 105 has been emptied, it may simply be removed and discarded to be replaced by a new reservoir 105 as purchased.

In order to place the exterminating liquid 107 into liquid communication with the suction side of the pump 101, supply tube 108 passes through a sliding seal 109 incorporated into a cap 110 which is adapted to engage the standard threads of the replaceable reservoir 105. Thus, it will be understood that when the reservoir 105 is replaced, the cap 110 is first unscrewed and slid up on the supply tube 108 to permit the replaceable reservoir 105 to be brought forward and lowered off the supply tube 108. Replacing the full container 105 is achieved by simply reversing that process. Preferably, the lower end of the supply tube 108, which is the actual withdrawal point of the exterminating liquid 107, is provided with a fine mesh filter 111 which serves to prevent any fine particles from being drawn into the exterminating liquid distribution subsystem where the relatively small distribution apertures (nozzles) are subject to blockage.

The pressure side of the pump 101 feeds a distribution trunk tube 112. In line with the distribution trunk tube 112 is a pressure sensor 113 which is adapted to sense and indicate normal and abnormal operating pressures on the pressure side of the pump 101. If the pressure within the distribution trunk tube 112 remains within a normal range during a system on period, the pressure sensor provides no special indication. If, however, the pressure in the distribution trunk tube suddenly drops far below the normal operating range, that is an indication that the pump 101 has lost its suction and that the replaceable reservoir 105 is empty. As a result, the empty indicator 114 (which may be a light, but also may be a sonic device such as a buzzer and may also be situated remote from the pressure sensor 113) is actuated to indicate the empty condition. If, on the other hand, the pressure within the distribution trunk tube 112 is sensed by the pressure sensor 113 to be higher than within the normal range, then a blockage indicator 115 is actuated to alert the operator to a possible major blockage condition in the distribution system.

FIGS. 7, 8 and 9 illustrate alternative components which may be used as the branch passages from which the exterminating liquid may be dispensed and which enjoy the advantage, over the similar distribution passages illustrated in FIGS. 4 and 5, of not only wetting the region at which the walls and floor adjoin, but also wetting the upper surface of a floor plate 116 (FIGS. 8, 9) in the same manner as the fully built-in system as illustrated, for example, in FIG. 3 without the necessity for accessing the inter-wall space. Thus, as shown in FIGS. 8 and 9, an area is removed from the bottom of the relevant wall board 118 provide a very narrow horizontal slot 117 for accessing the interior of the wall space. Referring particularly to FIG. 8, a distribution tube 119 may be situated just beneath the wall board 118 and is provided with small apertures 120 to act as nozzles for wetting the upper surface of the floor plate 116. Optionally, downwardly directed apertures 121 may also be provided to wet the region at which the floor and wall adjoin as previously described in conjunction with FIGS. 4 and 5.

The distribution passages may be integrated within a length of trim in a manner similar to that shown in FIG. 5. Thus, as shown in FIG. 7, a length of trim 122 is provided with a passage 123 and periodically distributed, horizontally directed apertures 124 to inject the exterminating liquid beneath the wall board and into the inter-wall space as previously described.

Similarly, as shown in FIG. 9, a piece of trim 25 is provided with a passage 126 from which extend horizontally directed apertures 127 and downwardly directed apertures 128 to provide means for respectively injecting the exterminating liquid into the inter-wall space and spraying it toward toward the junction of the floor and wall.

If (prior to the installation of the system generally in accordance with the removal of the lower strip of wall board 118 as illustrated in FIGS. 8 and 9) the original piece of trim is sufficiently low, the wall board slot 117 may be made immediately above such original trim, the branch passages installed, and a taller piece of trim installed over the old trim to provide a further efficiency in installing the system. When the distribution channel is integral with the trim, then the total installation of the distribution subsystem becomes very simple using this approach.

Consideration must be given, of course, to the materials used in constructing the system inasmuch as it is intended for long term use with somewhat corrosive liquids and, in the case of a fully built in embodiment, includes distribution subsystems which are not readily accessed. The pump and distribution tubing, etc., of course, must be able to resist any corrosive effects from the selected pesticide or pesticides employed on a long term basis. Additionally, it is desirable to use sufficient pressure to inhibit any tendency of the small apertures through which the pesticide is dispensed to become plugged. While chemically resistant plastics are entirely acceptable in many installations, I generally prefer to use metal tubing and passagework fabricated, for example, from copper or aluminum. For the highest quality installations, such as in a hospital or hotel, stainless steel may be used to advantage.

The selection for the position in a given installation of the exterminating liquid supply subsystem is a matter of choice according to the requirements and layout of the building. Since many pesticides are potentially dangerous, it will be preferred to situate the supply subsystem in a locked room or at least provide it with a lockable cover. The selection of the pesticide used in a given installation at a given time is directly related to the type of pests encountered. Different types of pesticides can be employed sequentially or even mixed if the chemistry of the pesticides will not produce an undesirable condition as the result of such mixing. Mixing should not be undertaken unless the user is certain of the consequences.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A pest extermination system permanently installed in a building structure, which building structure includes adjoining walls and floors, said extermination system comprising:

(A) an exterminating liquid supply subsystem, said supply subsystem comprising:
   1. a replaceable reservoir for holding a supply of exterminating liquid;
   2. an electrically driven pump having an inlet and an outlet;
   3. means coupling said pump inlet to said reservoir for establishing fluid communication therebetween to thereby permit withdrawal of exterminating liquid from said reservoir by said pump; and
   4. switch means coupled to a source of electrical energy and to said pump for selectively energizing said pump, said switch means including:
      a. first and second timers for cooperatively selectively energizing and deenergizing said pump according to a predetermined schedule;
         i. said first timer being adapted to periodically establish the commencement of a system on time; and
         ii. said second timer being adapted to respond to the establishment of the commencement of each system on time to establish a period during which said pump is energized; and (B) an exterminating liquid distribution subsystem, said distribution subsystem comprising:
   1. a distribution trunk tube connected to said pump outlet to receive pressurized exterminating liquid withdrawn from said reservoir by said pump;
   2. a pressure sensor connected in line with said distribution trunk tube and adapted to sense and indicate normal and abnormal operating pressures; and
   3. at least one branch passage coupled to and fed with pressurized exterminating liquid by said distribution trunk tube, said branch passage extending generally horizontally along a wall and being disposed proximate a floor adjoining the wall, said branch passage having a plurality of small generally outwardly directed apertures piercing its wall at intervals along its length to effect nozzles through which pressurized exterminating liquid is dispensed, said branch passage being integrated within a length of trim adapted to improve the appearance of the junction between the wall and the adjoining floor.

* * * * *